United States Patent
Kim et al.

(10) Patent No.: US 11,176,504 B2
(45) Date of Patent: Nov. 16, 2021

(54) IDENTIFYING CHANGES IN HEALTH AND STATUS OF ASSETS FROM CONTINUOUS IMAGE FEEDS IN NEAR REAL TIME

(71) Applicant: INTERNATIONAL BUSINESS MACHINES CORPORATION, Armonk, NY (US)

(72) Inventors: Younghun Kim, White Plains, NY (US); Abhishek Raman, Santa Clara, CA (US); Chandramouli Visweswariah, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 788 days.

(21) Appl. No.: 15/135,726

(22) Filed: Apr. 22, 2016

(65) Prior Publication Data
US 2017/0308834 A1    Oct. 26, 2017

(51) Int. Cl.
*G06Q 10/00* (2012.01)
*G06T 7/00* (2017.01)
(Continued)

(52) U.S. Cl.
CPC ....... *G06Q 10/06315* (2013.01); *G06T 7/001* (2013.01); *G06T 7/30* (2017.01); *G06T 7/97* (2017.01); *G06T 2207/20221* (2013.01)

(58) Field of Classification Search
USPC ...................................................... 705/7.25
See application file for complete search history.

(56) References Cited

U.S. PATENT DOCUMENTS 6,064,770 A * 5/2000 Scarth .................. G06K 9/6221
382/159
6,418,430 B1 * 7/2002 DeFazio .............. G06K 9/6857
(Continued)

FOREIGN PATENT DOCUMENTS

WO    2008055499 A2    5/2008

OTHER PUBLICATIONS

Adhikari et al., Automation in Construction, Jul. 27, 2013, Elsevier, 39, 180-194 (Year: 2013).*
(Continued)

*Primary Examiner* — Timothy Padot
*Assistant Examiner* — Allison M Neal
(74) *Attorney, Agent, or Firm* — Kenneth Han

(57) ABSTRACT

A method for assessing an asset status is provided. The method may include identifying, by a processor, an asset within a plurality of tangible, deployed assets. The method may also include retrieving a plurality of images from at least one data repository, whereby the plurality of images are captured within a preconfigured distance of the identified asset. The method may further include determining a portion of the retrieved plurality of images depict the identified asset. The method may also include performing a plurality of image processing techniques on the determined portion. The method may further include creating an assessment of the asset status of the identified asset based on the performed plurality of image processing techniques, whereby the created assessment details whether the identified asset needs a repair or a replacement.

20 Claims, 8 Drawing Sheets

(51) Int. Cl.
*G06Q 10/06* (2012.01)
*G06T 7/30* (2017.01)

(56) References Cited

U.S. PATENT DOCUMENTS

| | | | |
|---|---|---|---|
| 9,158,035 B2 | 10/2015 | Dam | |
| 9,158,036 B2 | 10/2015 | Liu et al. | |
| 9,575,641 B2* | 2/2017 | Shechtman | G06F 3/04845 |
| 2010/0171826 A1* | 7/2010 | Hamilton | G06Q 30/06 |
| | | | 348/135 |
| 2013/0064178 A1 | 3/2013 | Cs et al. | |
| 2014/0081998 A1 | 3/2014 | Fan et al. | |
| 2014/0253733 A1 | 9/2014 | Norem et al. | |
| 2014/0267588 A1* | 9/2014 | Areas | G06T 3/4038 |
| | | | 348/36 |
| 2014/0358601 A1* | 12/2014 | Smiley | G06Q 10/0635 |
| | | | 705/7.11 |
| 2014/0362230 A1* | 12/2014 | Bulan | G06K 9/3241 |
| | | | 348/169 |
| 2015/0161176 A1* | 6/2015 | Majkowska | G06F 16/532 |
| | | | 707/722 |
| 2016/0180467 A1* | 6/2016 | Griffin | G06Q 40/08 |
| | | | 705/4 |
| 2016/0255282 A1* | 9/2016 | Bostick | G06T 7/277 |
| | | | 348/39 |
| 2017/0225336 A1* | 8/2017 | Deyle | G08B 13/196 |
| 2018/0239948 A1* | 8/2018 | Rutschman | G06T 7/20 |

OTHER PUBLICATIONS

CSIC, "National Grid's London Power Tunnels," Innovative Sensing for Infrastructure, 2015, 1 Page, Cambridge Centre for Smart Infrastructure and Construction (CSIC).

De Vries, "Object Recognition: A Shape-Based Approach using Artificial Neural Networks," University of Utrecht Graduation Project, 2006, p. 1-93.

Fleet et al., "Optical Flow Estimation," Mathematical Models in Computer Vision: The Handbook, 2005, p. 1-24, Chapter 15, Springer.

General Electric, "Utility Solutions," Integrated Automation for Electric Utilities, 2002, 16 Pages, General Electric Company.

Jain et al., "Object Recognition," Machine Vision, 1995, p. 459-491, Chapter 15, McGraw-Hill Series in Computer Science, McGraw-Hill, Inc.

Mell et al., "The NIST Definition of Cloud Computing," National Institute of Standards and Technology, Sep. 2011, p. 1-3, Special Publication 800-145.

Oji, "An Automatic Algorithm for Object Recognition and Detection Based on ASIFT Keypoints," Signal & Image Processing: An International Journal (SIPIJ), Oct. 2012, p. 29-39. vol. 3, No. 5.

Sinha et al., "Computer Vision Techniques for Automatic Structural Assessment of Underground Pipes," Computer-Aided Civil and Infrastructure Engineering, 2003, p. 95-112, vol. 18, Blackwell Publishing.

Yang et al., "Power Line Sensornet—A New Concept for Power Grid Monitoring," IEEE Power Engineering Society General Meeting, 2006, p. 1-8.

* cited by examiner

IDENTIFYING CHANGES IN HEALTH AND STATUS OF ASSETS FROM CONTINUOUS IMAGE FEEDS IN NEAR REAL TIME

BACKGROUND

The present invention relates, generally, to the field of computing, and more particularly to asset management.

Asset management may relate to monitoring and maintaining an item of value, regardless of whether the item of value is tangible or intangible. Tangible assets may include buildings, furniture, computer systems, and electrical equipment. Intangible assets may include human capital, intellectual property, and finances. Typically asset management is utilized by businesses and organizations to efficiently deploy, operate, maintain, upgrade, and dispose of assets in a cost effective manner.

SUMMARY

According to one embodiment, a method for assessing an asset status is provided. The method may include identifying, by a processor, an asset within a plurality of tangible, deployed assets. The method may also include retrieving a plurality of images from at least one data repository, whereby the plurality of images are captured within a preconfigured distance of the identified asset. The method may further include determining a portion of the retrieved plurality of images depict the identified asset. The method may also include performing a plurality of image processing techniques on the determined portion. The method may further include creating an assessment of the asset status of the identified asset based on the performed plurality of image processing techniques, whereby the created assessment details whether the identified asset needs a repair or a replacement.

According to another embodiment, a computer system for assessing an asset status is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include identifying, by a processor, an asset within a plurality of tangible, deployed assets. The method may also include retrieving a plurality of images from at least one data repository, whereby the plurality of images are captured within a preconfigured distance of the identified asset. The method may further include determining a portion of the retrieved plurality of images depict the identified asset. The method may also include performing a plurality of image processing techniques on the determined portion. The method may further include creating an assessment of the asset status of the identified asset based on the performed plurality of image processing techniques, whereby the created assessment details whether the identified asset needs a repair or a replacement.

According to yet another embodiment, a computer program product for assessing an asset status is provided. The computer program product may include one or more computer-readable storage devices and program instructions stored on at least one of the one or more tangible storage devices, the program instructions executable by a processor. The computer program product may include program instructions to identify an asset within a plurality of tangible, deployed assets. The computer program product may also include program instructions to retrieve a plurality of images from at least one data repository, whereby the plurality of images are captured within a preconfigured distance of the identified asset. The computer program product may further include program instructions to determine a portion of the retrieved plurality of images depict the identified asset. The computer program product may also include program instructions to perform a plurality of image processing techniques on the determined portion. The computer program product may further include program instructions to create an assessment of the asset status of the identified asset based on the performed plurality of image processing techniques, whereby the created assessment details whether the identified asset needs a repair or a replacement.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
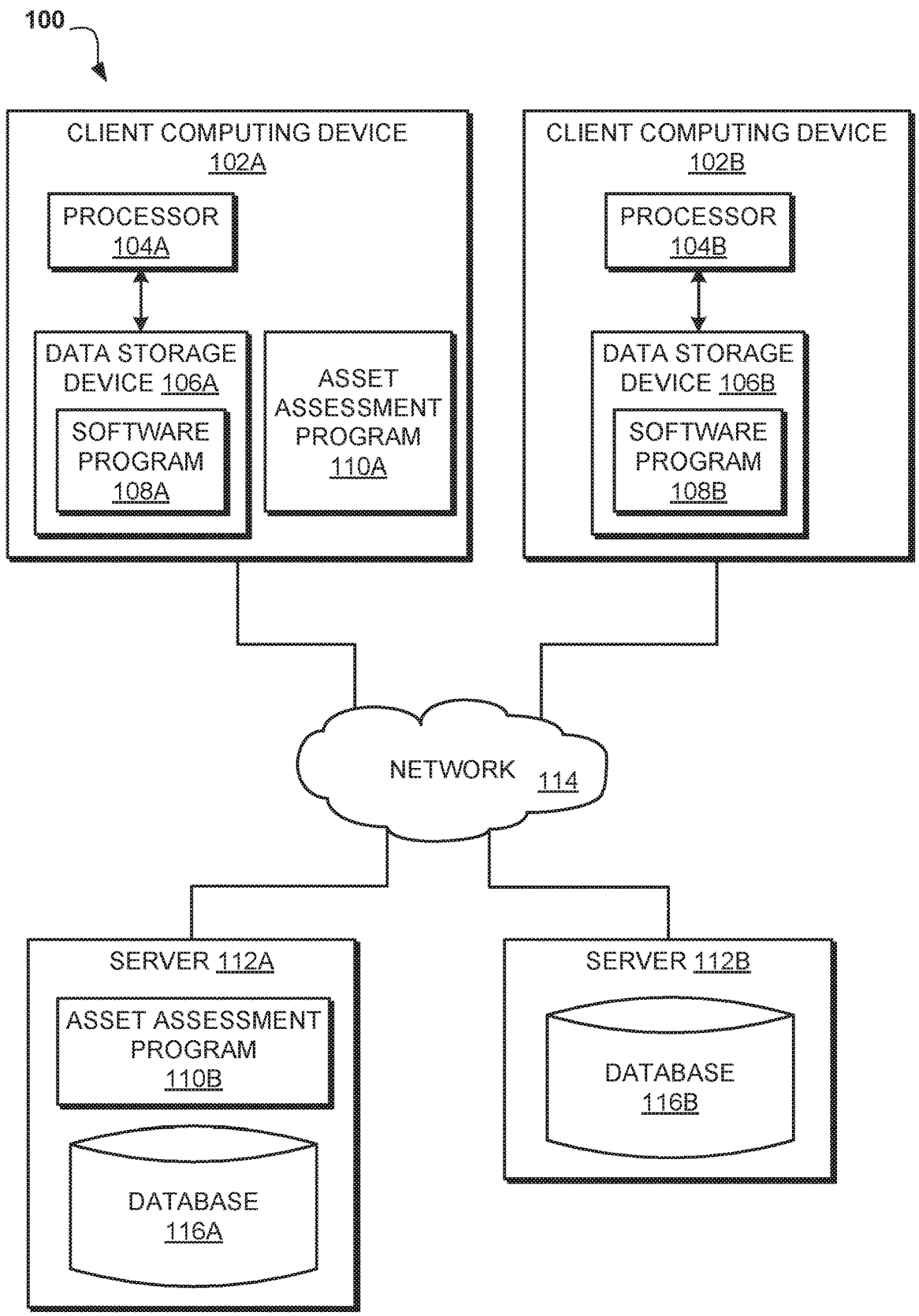
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to asset management. The following described exemplary embodiments provide a system, method, and program product to, among other things, monitor and assess the status of deployed assets using various data sources. Therefore, the present embodiment has the capacity to improve the technical field of asset management by allowing for remote, continuous, and automatic assessment of the status of deployed assets using images or videos uploaded to a network.

As previously described, asset management may relate to monitoring and maintaining an item of value, regardless of whether the item of value is tangible or intangible. Tangible assets may include buildings, furniture, computer systems, and electrical equipment. Intangible assets may include human capital, intellectual property, and finances. Typically asset management is utilized by businesses and organizations to efficiently deploy, operate, maintain, upgrade, and dispose of assets in a cost effective manner.

An asset distribution grid may contain a large number of tangible assets distributed over a large geographical area. For example, an electrical company managing an electrical grid that services a city may have millions of assets, such as electrical poles, wires, and transformers, distributed throughout the city. Distributed assets may not be monitored with dedicated monitoring equipment, such as a device that issues notifications when the asset fails. Therefore, individuals may be required to manually assess the functionality of the asset on a periodic basis or rely on customers to report asset status. For example, in the case of an electrical company, crew members may manually check the status of deployed transformers every year or rely on customers to report electrical outages.

However, periodic maintenance assessments and customer reports may not be efficient measures for maintaining assets since structural degradation of an asset may cause an asset to fail between periodic assessments and customers may only report asset degradation when a catastrophic event has occurred. For example, a power transformer may pass a crew member check but significant structural degradation that causes a system failure may occur before a follow up assessment can be performed. Similarly, a customer may not report the transformer's degradation until a power outage occurs since the customer may not recognize the transformer is degrading. Such structural degradation may be identified before a catastrophic failure, if a subject matter expert is remotely alerted to the degrading status of deployed assets. As such, it may be advantageous, among other things, to implement a system that utilizes geo-tagged images and videos to identify the status of deployed assets.

According to one embodiment, images of tangible, deployed assets may be continuously retrieved from various data sources, such as satellite images, designated web cameras, field crew captured pictures, and collected street view pictures. The retrieved images may be analyzed and the field of view depicted within the images may be adjusted to capture changes within the images. Feature differences within the analyzed images may be calculated and extracted using image differencing algorithms. Interactive annotation tools may then be used to assign a meaning to each feature difference extracted from the analyzed images. The assigned meaning may be used by a subject matter expert to identify deployed assets that are degrading or are otherwise in need of maintenance.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product that utilize images retrieved from various image sources to identify deployed assets in need of maintenance or repair due to degradation or a catastrophic failure. More specifically, the retrieved images may be compared to stored images within a database using image differencing technology to assist a subject matter expert in determining the current status of deployed assets.

Referring to FIG. 1, an exemplary networked computer environment 100 is depicted, according to at least one embodiment. The networked computer environment 100 may include a client computing device 102A, 102B and a server 112A, 112B interconnected via a communication network 114. According to at least one implementation, the networked computer environment 100 may include a plurality of client computing devices 102A, 102B and a plurality of servers 112A, 112B, only two of which are shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102A, 102B may include a processor 104A, 104B and a data storage device 106A, 106B that is enabled to host and run a software program 108A, 108B and an asset assessment program 110A and communicate with the server 112A, 112B via the communication network 114, in accordance with one embodiment of the invention. The client computing device 102A, 102B may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102A, 102B may include internal components 602a and external components 604a, respectively.

The server computer 112A, 112B may be a laptop computer, netbook computer, personal computer (PC), a desktop computer, or any programmable electronic device or any network of programmable electronic devices capable of hosting and running an asset assessment program 110B and a database 116A, 116B and communicating with the client computing device 102A, 102B via the communication network 114, in accordance with embodiments of the invention. As will be discussed with reference to FIG. 6, the server computer 112A, 112B may include internal components 602b and external components 604b, respectively. The server 112A, 112B may also operate in a cloud computing service model, such as Software as a Service (SaaS), Platform as a Service (PaaS), or Infrastructure as a Service (IaaS). The server 112A, 112B may also be located in a cloud computing deployment model, such as a private cloud, community cloud, public cloud, or hybrid cloud.

According to the present embodiment, the asset assessment program 110A, 110B may be a program capable of receiving images of deployed assets from various sources, such as user-captured pictures and streaming video feeds, analyzing the received images for status information corresponding to a deployed asset, and creating an assessment of the status of the depicted deployed asset. The asset assessment method is explained in further detail below with respect to FIGS. 2-5.

Figure 2:
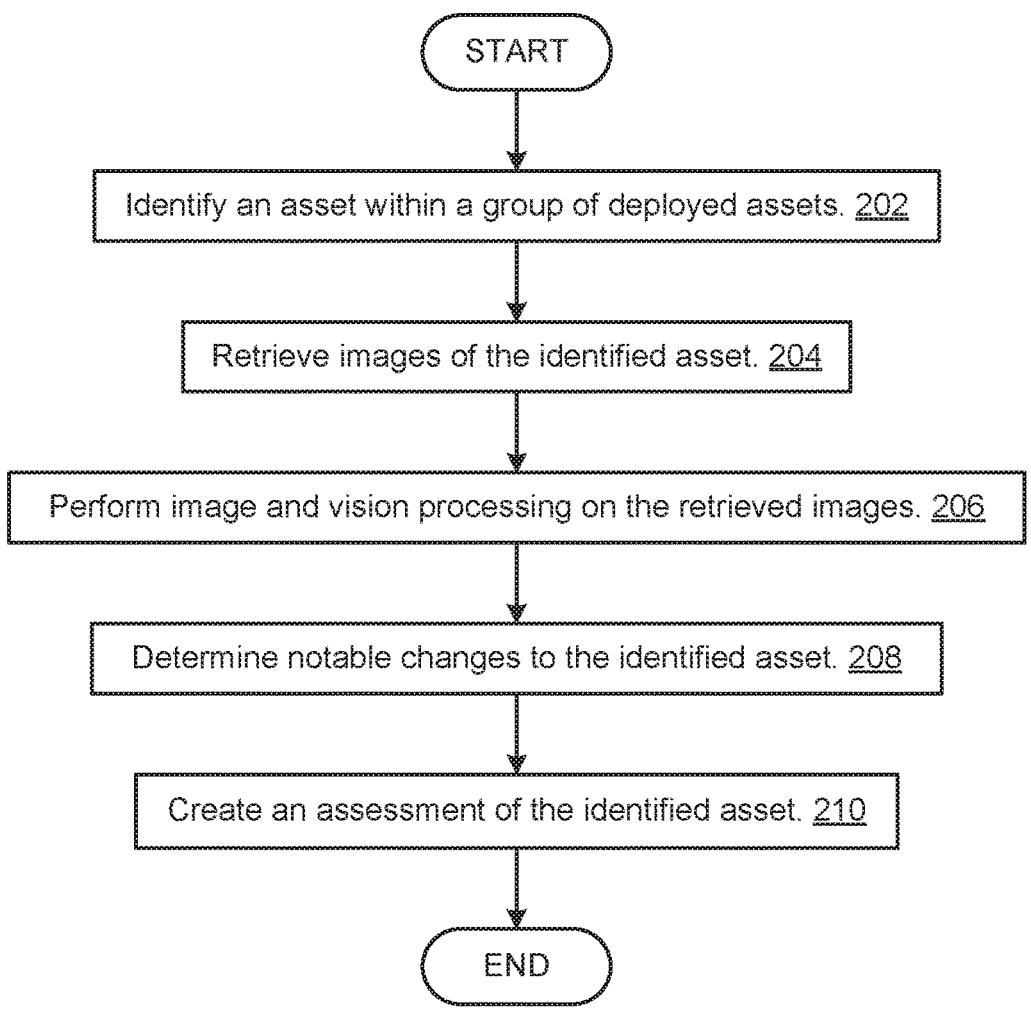
FIG. 2 is an operational flowchart illustrating an image stitching asset assessment process according to at least one embodiment.

Referring now to FIG. 2, an operational flowchart illustrating an image stitching asset assessment process 200 is depicted, according to at least one embodiment. At 202, the asset assessment program 110A, 110B (FIG. 1) identifies an asset within a group of deployed assets. A list of deployed assets may be maintained within a database 116A, 116B (FIG. 1). A user charged with monitoring the operation of deployed assets may browse through the list of the deployed assets on a graphical user interface associated with the client computing device 102A (FIG. 1). Once the user identifies a deployed asset for inspection, the user may select the deployed asset through an interaction with the graphical user interface. The asset assessment program 110A, 110B (FIG. 1) may identify the asset based on the user selection from the list of deployed assets within the database 116A, 116B (FIG. 1). For example, if a user responsible for maintaining the operational status of an electrical grid is observing deployed assets on a client computing device 102A (FIG. 1), the user may browse through the list of deployed assets displayed on a graphical user interface using a computer mouse and select an asset the user wishes to assess.

In another embodiment, the asset assessment program 110A, 110B (FIG. 1) may identify the asset based on a period of elapsed time since the most recent assessment was conducted on the asset. For example, the asset assessment program 110A, 110B (FIG. 1) may be preconfigured to assess each deployed asset once a year. Therefore, if the asset assessment program 110A, 110B (FIG. 1) has not completed an assessment of a deployed asset in a year, the asset assessment program 110A, 110B (FIG. 1) may identify the asset so an assessment may be completed.

Then, at 204, the asset assessment program 110A, 110B (FIG. 1) retrieves images captured within a preconfigured distance of the identified asset. Once the asset assessment program 110A, 110B (FIG. 1) identifies an asset based on user selection, the asset assessment program 110A, 110B (FIG. 1) may retrieve the images geographically tagged with a location within a preconfigured proximity of the identified asset by utilizing known image capture technology, such as designated web cameras connected to deployed assets or uploaded user-captured images. For example, the identified asset may be located at a geographical location designated by coordinates latitude and longitude. The asset assessment program 110A, 110B (FIG. 1) may be preconfigured to retrieve images geographically tagged within 100 feet of the geographic location of the deployed asset. Therefore, the asset assessment program 110A, 110B (FIG. 1) may search data repositories, such as database 116B (FIG. 1), to retrieve the images captured within the preconfigured distance of the identified asset. In at least one embodiment, the retrieved images may include a time-stamp detailing when the retrieved images were captured.

The data repositories searched by the asset assessment program 110A, 110B (FIG. 1) may include image data repositories, such as Picasa™ (Picasa and all Picasa-based trademarks and logos are trademarks or registered trademarks of Google Inc. and/or its affiliates) and Flickr® (Flickr and all Flickr-based trademarks and logos are trademarks or registered trademarks of Yahoo! Inc. and/or its affiliates), that store user uploaded images. Furthermore, when retrieving images the asset assessment program 110A, 110B (FIG. 1) may utilize satellite images using geographical information system (GIS) databases and map providers, such as Google Maps™ (Google Maps and all Google Maps-based trademarks and logos are trademarks or registered trademarks of Google Inc. and/or its affiliates). Furthermore, the asset assessment program 110A, 110B (FIG. 1) may retrieve the images of the identified asset from the database 116A (FIG. 1) within server 112A (FIG. 1), which may contain a categorized list of images captured using a global positional system-enabled camera by a user. For example, if an employee of a company that maintains an electrical grid captures a picture of an asset while performing normal job responsibilities, the employee may upload the picture to database 116A (FIG. 1) for later access by the asset assessment program 110A, 110B (FIG. 1). Additionally, the asset assessment program 110A, 110B (FIG. 1) may be capable of collecting street view images from a GIS database of candidate assets within the list of deployed assets.

Next, at 206, the asset assessment program 110A, 110B (FIG. 1) processes the retrieved image using image processing and vision processing techniques. Since the retrieved images are only taken within a preconfigured distance of the identified asset, the retrieved images may depict the identified asset from various distances and angles. For example, one retrieved image may depict a northerly facing side of a transformer while another retrieved image may depict a southerly facing side of the transformer. Furthermore, some retrieved images may not depict the identified asset. For example, a camera that captured a retrieved image may be facing away from the identified asset but was still within the preconfigured distance of the identified asset. Once the asset assessment program 110A, 110B (FIG. 1) has retrieved images of the identified asset, the asset assessment program 110A, 110B (FIG. 1) may perform known image and vision processing techniques, such as image differencing algorithms, difference operation techniques, optical flow analysis, object identification algorithms, and movement detection algorithms, on the retrieved images in order to filter out images that do not depict the identified asset, adjust the field of view of the identified asset, and stitch together images depicting the identified asset.

When determining whether the retrieved images depict the identified asset, the asset assessment program may utilize known object identification technology to detect the presence of the identified asset within a retrieved image. The asset assessment program 110A, 110B (FIG. 1) may store asset class images within a data repository, such as database 116A (FIG. 1), that detail features of each asset in the class. The asset assessment program 110A, 110B (FIG. 1) may utilize the optical recognition technology to compare the retrieved images to the stored asset class images within database 116A (FIG. 1). For example, if the identified asset is an electrical pole, the asset assessment program 110A, 110B (FIG. 1) may retrieve class images of an electrical pole from database 116A (FIG. 1) and determine whether the identified asset is depicted in each retrieved image through comparative analysis. If the asset assessment program 110A, 110B (FIG. 1) determines a retrieved image does not contain a depiction of the identified asset, the asset assessment program 110A, 110B (FIG. 1) may drop the retrieved image. Dropping the retrieved image may relate to the asset assessment program 110A, 110B (FIG. 1) deleting the image from memory, flushing the image from a cache, or otherwise abandoning the retrieved image. If the asset assessment program 110A, 110B (FIG. 1) determines a retrieved image does include the identified asset based on the application of the known optical recognition technology and the stored asset class images, the asset assessment program 110A, 110B (FIG. 1) may retain the retrieved image.

Once the asset assessment program 110A, 110B (FIG. 1) has dropped each retrieved image that does not depict the identified asset, the asset assessment program 110A, 110B (FIG. 1) may perform known image stitching algorithms using the retrieved images depicting the identified asset. Image stitching may relate to the process of combining images together to create a single larger image. For example, one retrieved image may depict the rightmost two-thirds of an asset while another retrieved image may depict the leftmost two-thirds of an asset. Since neither image provides a complete depiction of the asset, image stitching may be utilized to combine the images together so a complete depiction of the asset may be represented within a single picture. During the image stitching, overlap regions from consecutive images may be extracted from the stitched image. For example, in the previous situation involving two retrieved images depicting different two-thirds portions of the same asset, the same one-third portion of the asset may be depicted in both retrieved images. Therefore, the asset assessment program 110A, 110B (FIG. 1) may extract the one-third portion of the asset depicted in one of the retrieved images in order to provide a clearer stitched image. The asset assessment program 110A, 110B (FIG. 1) may determine which portion of the overlapped images to retain based on the image clarity and brightness. In another embodiment, the asset assessment program 110A, 110B (FIG. 1) may create a three-dimensional representation of the identified asset using the retrieved images. For example, if the asset assessment program 110A, 110B (FIG. 1) retrieves an image depicting the identified asset from each of the four cardinal directions (i.e. north, south, east, and west), the asset assessment program 110A, 110B (FIG. 1) may stitch each of the retrieved images together to create a three-dimensional model of the identified asset.

Then, at 208, the asset assessment program 110A, 110B (FIG. 1) determines notable changes to the identified asset. A notable change may relate to an alteration to the identified asset, such as flora overgrowth, corrosion, degradation, or tampering, from the original state of the asset. The asset assessment program 110A, 110B (FIG. 1) may be preconfigured with original asset state information based on the asset type of deployed assets and criteria that qualify as a notable change to a deployed asset within each asset type. For example, the original state of an electric pole may be a ground-to-pole angle of 90° since the electric pole may be deployed vertically to support electrical transmission wires. Additionally, the asset assessment program 110A, 110B (FIG. 1) may be preconfigured to treat a tilt greater than 10° in a deployed electric pole as a notable change within the asset. Therefore, if the asset assessment program 110A, 110B (FIG. 1) determines the identified asset represented in a processed image has a ground-to-pole angle below 80°, then the asset assessment program 110A, 110B (FIG. 1) may determine a notable change has occurred to the electrical pole. As an additional example, the asset assessment program 110A, 110B (FIG. 1) may be preconfigured to determine a notable change has occurred in an identified asset when 60% of the identified asset is obstructed. Therefore, when only 39% of the identified asset is visible (i.e. 61% of the identified asset is obstructed) within the processed image, the asset assessment program 110A, 110B (FIG. 1) may determine a notable change in the identified asset is present. When determining the presence of notable changes, the asset assessment program 110A, 110B (FIG. 1) may utilize known image analysis technology to determine the presence of notable changes within the processed image, such as optical flow analysis and movement detection algorithms.

Next, at 210, the asset assessment program 110A, 110B (FIG. 1) creates an assessment of the identified asset. Once the asset assessment program 110A, 110B (FIG. 1) has determined whether notable changes are present within the processed image, the asset assessment program 110A, 110B (FIG. 1) may create an assessment of the identified asset based on the asset type and the notable change type, such as obstruction, corrosion, degradation, or tampering. If the asset assessment program 110A, 110B (FIG. 1) determined notable changes are present in the processed image, the asset assessment program 110A, 110B (FIG. 1) may determine suggested corrective actions be taken. For example, if the asset assessment program 110A, 110B (FIG. 1) determines an identified asset is obstructed by vegetative overgrowth beyond a preconfigured threshold, the asset assessment program 110A, 110B (FIG. 1) may create an assessment that details the vegetative overgrowth of the identified asset and suggest a crew be dispatched with the appropriate tools to remove the vegetative overgrowth.

Figure 3:
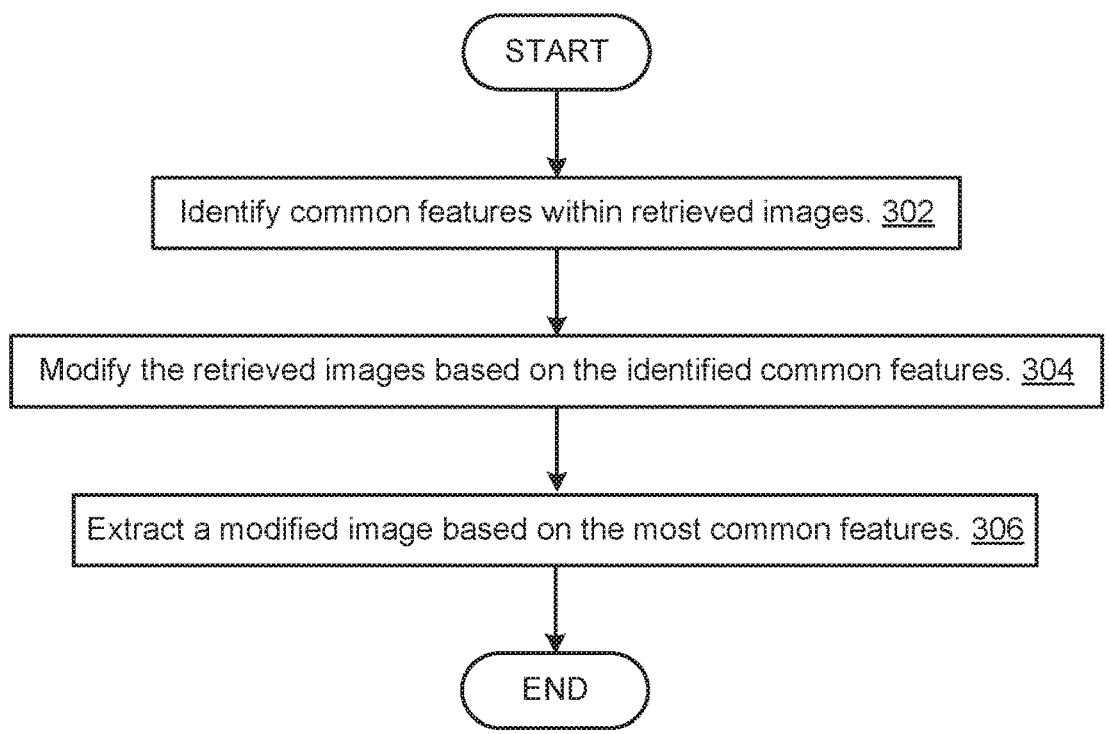
FIG. 3 is an operational flowchart illustrating an image stitching process according to at least one embodiment.

Referring now to FIG. 3, an operational flowchart illustrating an image stitching process 300 is depicted, according to at least one embodiment. When performing image and vision processing at step 206 in FIG. 2, the asset assessment program 110A, 110B (FIG. 1) may perform known image stitching techniques to modify retrieved images depicting an identified asset. At 302, the asset assessment program 110A, 110B (FIG. 1) identifies common features within the retrieved images. In order to properly modify the retrieved images, the asset assessment program 110A, 110B (FIG. 1) may identify common features shared by multiple retrieved images to serve as reference points. For example, two retrieved images depicting a transformer may depict the same warning sticker attached to the transformer. Therefore, since the warning sticker is depicted on both retrieved images, the warning sticker may be identified as a common feature. Additionally, the asset assessment program 110A, 110B (FIG. 1) may utilize known object recognition technology, such as image differencing algorithms, difference operation techniques, optical flow analysis, object identification algorithms, and movement detection algorithms, to identify the common features depicted among retrieved images.

Then, at 304, the asset assessment program 110A, 110B (FIG. 1) modifies the retrieved images based on the identified common features. Since the identified common features within each retrieved image may serve as reference points to equate each retrieved image to the other retrieved images, the common features may be used to modify the retrieved images together. Modifying the retrieved images based on an identified common feature may include moving, morphing, projecting, combining, or overlapping the retrieved images to create a single image depicting the identified common feature. Since multiple common features may be identified and an identified common feature may not appear in every retrieved image, the asset assessment program 110A, 110B (FIG. 1) may create multiple modified images from the retrieved images. For example, the asset assessment program 110A, 110B (FIG. 1) may identify two common features among a series of three retrieved images (i.e. image A, image B, and image C) where a first common feature is depicted in image A and image B and a second common feature is depicted in image B and image C. Since the common features are not depicted in all of the retrieved images, the asset assessment program 110A, 110B (FIG. 1) may create a first image by modifying image A and image B and a second image by modifying image B and image C.

Next, at 306, the asset assessment program 110A, 110B (FIG. 1) extracts a modified image based on the most identified common features. Since the modified image with the most identified common features may present the most complete depiction of the identified asset, the asset assessment program 110A, 110B (FIG. 1) may determine that the most useful modified image to extract from the image stitching process 300 is the modified image that has the most identified common features. Therefore, the modified image with the most identified common features may be utilized to create an assessment of the identified asset. For example, the asset assessment program 110A, 110B (FIG. 1) may have created two modified images based on four common features. If one modified image contains two common features and another modified image contains three common features, the asset assessment program 110A, 110B (FIG. 1) may extract the modified image with three common features since the modified image with three common features may be a more complete depiction of the current status of the identified asset.

Figure 4:
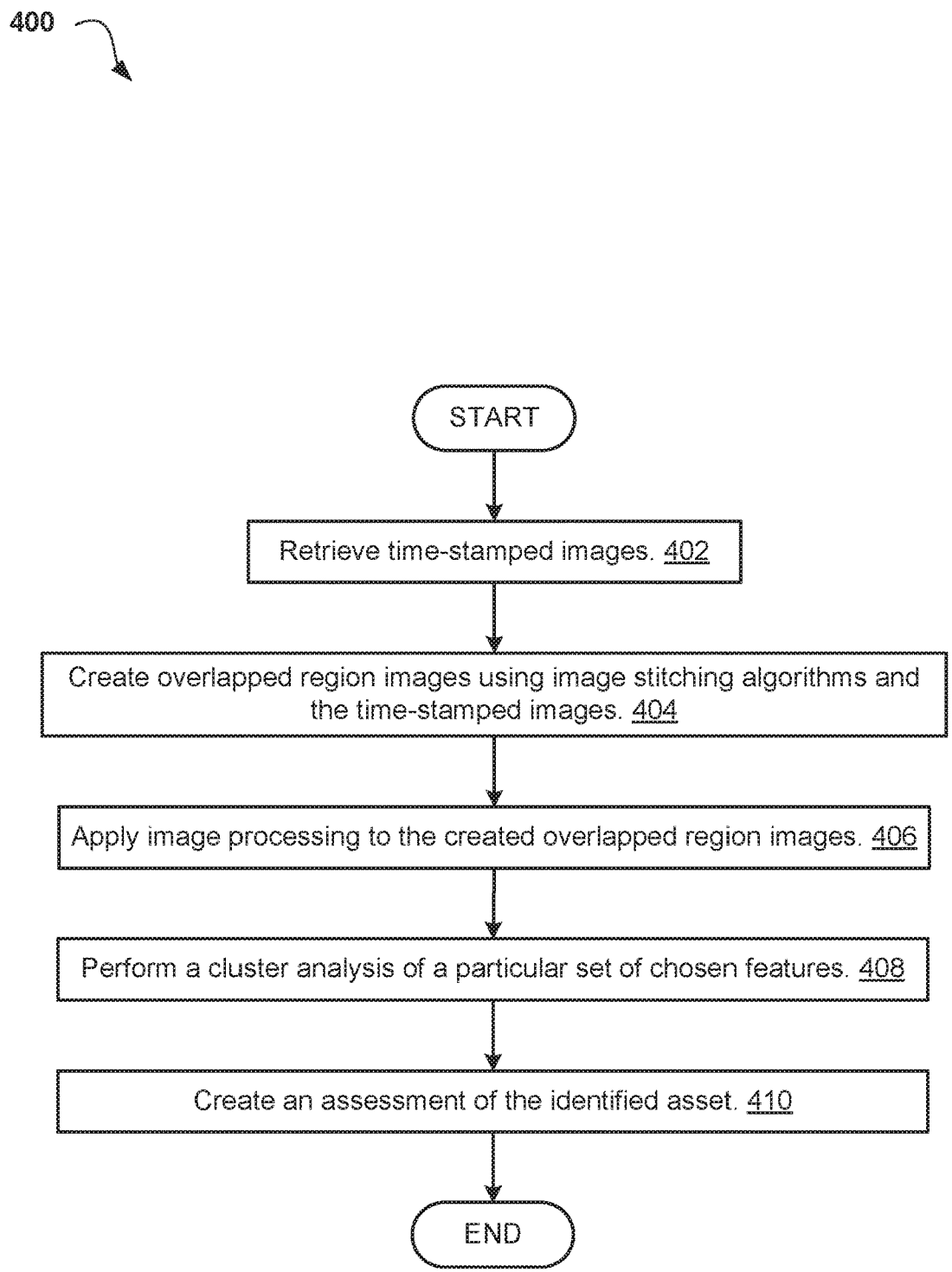
FIG. 4 is an operational flowchart illustrating an asset image comparison process according to at least one embodiment.

Referring now to FIG. 4, an operational flowchart illustrating an asset image comparison process 400 is depicted, according to at least one embodiment. The asset image comparison process 400 may illustrate the process of retrieving, processing, and comparing images of a deployed asset to determine if the deployed asset has changed over a period of time. At 402, the asset assessment program 110A, 110B (FIG. 1) retrieves time-stamped images of a deployed asset. The asset assessment program 110A, 110B (FIG. 1) may retrieve the time-stamped images in a similar manner as in step 204 (FIG. 2). For example, the asset assessment program 110A, 110B (FIG. 1) may retrieve images from designated web cameras and searched data repositories, such as database 116B (FIG. 1). As previously described, the data repositories searched by the asset assessment program 110A, 110B (FIG. 1) may include image data repositories that store user uploaded images and GIS databases. Additionally, each image retrieved by the asset assessment program 110A, 110B (FIG. 1) may be associated with a time-stamp that delineates when each image was captured. The time-stamp may allow the asset assessment program 110A, 110B (FIG. 1) to compare the retrieved images to identify changes to the deployed assets depicted within the images.

Then, at 404, the asset assessment program 110A, 110B (FIG. 1) creates overlapped region images using image stitching algorithms and the time-stamped images. In order to fully depict a deployed asset, the asset assessment program 110A, 110B (FIG. 1) may perform known image stitching techniques on the retrieved images that depict the deployed asset from various distances and angles. The asset assessment program 110A, 110B (FIG. 1) may utilize the image stitching process 300 depicted in FIG. 3 to create a series of overlapped regions of the time-stamped images. Furthermore, the asset assessment program 110A, 110B (FIG. 1) may only use retrieved images of the deployed asset that were captured within a specific time period to each other when creating the overlapped images. For example, the asset assessment program 110A, 110B (FIG. 1) may only use images that were captured during a three-month period to create the overlapped image. Therefore, the created overlapped images may provide an accurate representation of the deployed asset during the period in which the time-stamped images were captured. Additionally, the asset assessment program 110A, 110B (FIG. 1) may create multiple overlapped images taken during different time periods in order to perform known image differencing techniques on the created multiple overlapped images.

Next, at 406, the asset assessment program 110A, 110B (FIG. 1) applies image differencing algorithms to the created, overlapped region images to identify features of the deployed asset. Once the overlapped region images have been created from the retrieved time-stamped images using known image stitching algorithms, the asset assessment program 110A, 110B (FIG. 1) may apply known vision and image processing techniques to analyze the created overlapped region images. The known image differencing algorithms utilizing the asset assessment program 110A, 110B (FIG. 1) may include removing natural objects depicted within the overlapped region images, performing background subtraction, and identifying distinctive objects depicted within the overlapped region images (e.g. wires, electrical poles, and transformers). Additionally, the asset assessment program 110A, 110B (FIG. 1) may identify distinctive features on the deployed assets depicted within the overlapped region images. By allowing for the identification of distinctive features, the asset assessment program 110A, 110B (FIG. 1) may be capable of performing a cluster analysis of the identified distinctive features to determine if the distinctive features have degraded or been damaged to the point of needing maintenance or repair.

Then, at 408, the asset assessment program 110A, 110B (FIG. 1) performs a cluster analysis of the features of the asset depicted in the overlapped region images. Since the overlapped region images depict the deployed asset during different time periods, the asset assessment program 110A, 110B (FIG. 1) may utilize the cluster analysis to determine differences in the deployed asset over a specified period of time and whether those differences are significant enough to warrant attention. For example, the asset assessment program 110A, 110B (FIG. 1) may utilize the cluster analysis to compare an overlapped region image created using retrieved time-stamped images captured closely to the asset's deployment with an overlapped region image created using retrieved time-stamped images captured closely to a year after the asset's deployment. The cluster analysis may then indicate that the deployed asset needs attention based on the change in status from the earlier overlapped region image to the later overlapped region image.

Additionally, the cluster analysis performed by the asset assessment program 110A, 110B (FIG. 1) may utilize known analysis techniques, such as mean optical flow analysis, standard deviation of optical flow, and similarity between consecutive histogram differencing, to calculated statistical differences between the features of the deployed asset depicted in the overlapped region images. For example, if a transformer is depicted within the overlapped region image, the asset assessment program 110A, 110B (FIG. 1) may perform cluster analysis to determine whether all distinctive features of the transformer are present. Furthermore, the cluster analysis may be capable of identifying various classes of asset needs, such as degradation, obstruction, and omission. Degradation may relate to the natural wearing or erosion of the deployed asset, such as rusting or corrosion. Additionally, degradation may relate to a catastrophic event that affects the deployed asset, such as a lightning strike or tornado. For example, cluster analysis may allow the asset assessment program 110A, 110B (FIG. 1) to determine that an electric pole has leaned 10° from the last overlapped region image. Obstruction may relate to objects blocking the deployed asset from view in the overlapped region image, such as vegetative overgrowth. Omission may relate to the complete absence of the deployed asset from the overlapped region image when the deployed asset was present in an overlapped region image created with retrieved images with earlier time-stamps, such as when the deployed asset has been stolen or completely destroyed.

The cluster analysis applied by asset assessment program 110A, 110B (FIG. 1) may calculate a score when comparing the overlapped region images from different time periods. Based on the score calculated by the cluster analysis, the asset assessment program 110A, 110B (FIG. 1) may create an assessment with information corresponding to the calculated score. For example, if the calculated score of the identified asset exceeds a preconfigured threshold, the asset assessment program 110A, 110B (FIG. 1) may create an assessment of the identified asset that suggests replacement since the asset may be at the end of the lifecycle.

Furthermore, the asset assessment program 110A, 110B (FIG. 1) may assign a meaning value to features within the processed images by implementing interactive annotation tools. The meaning value may depend on the importance of a feature of the deployed asset. For example, the asset assessment program 110A, 110B (FIG. 1) may assign a higher numerical value to structural components of a transformer, such as supports, than to aesthetic components, such as paint. Additionally, the asset assessment program 110A, 110B (FIG. 1) may assign annotated clusters to future image feeds by applying a classification algorithm. Once the asset assessment program 110A, 110B (FIG. 1) has completed a cluster analysis of an overlapped region cluster, the asset assessment program 110A, 110B (FIG. 1) may assign a classification to the overlapped region image to assign a classification to the deployed asset depicted in the overlapped region image. For example, if an overlapped region image depicts a transformer, the asset assessment program 110A, 110B (FIG. 1) may apply the classification algorithm and assign the depicted asset to a transformer classification group in order to compare the depicted transformer to other deployed transformer assets depicted in other overlapped region images.

Next, at 410, the asset assessment program 110A, 110B (FIG. 1) creates an assessment of the asset depicted in the overlapped region image. Similar to step 210 in FIG. 2, if the asset assessment program 110A, 110B (FIG. 1) determines an assessment should be created based on the cluster analysis, the asset assessment program 110A, 110B (FIG. 1) may create an assessment of the asset depicted in the overlapped region image. Furthermore, the asset assessment program 110A, 110B (FIG. 1) may determine suggested corrective actions and include the suggested corrective actions in the assessment. For example, if the asset assessment program 110A, 110B (FIG. 1) determines an asset is obstructed by vegetative overgrowth beyond a preconfigured threshold, the asset assessment program 110A, 110B (FIG. 1) may create an assessment that details the vegetative overgrowth of the asset and suggest a crew be dispatched with the appropriate tools to remove the vegetative overgrowth. In at least one embodiment, the created assessment may be in the form of a notification with a message indicating the asset that needs attention.

Figure 5:
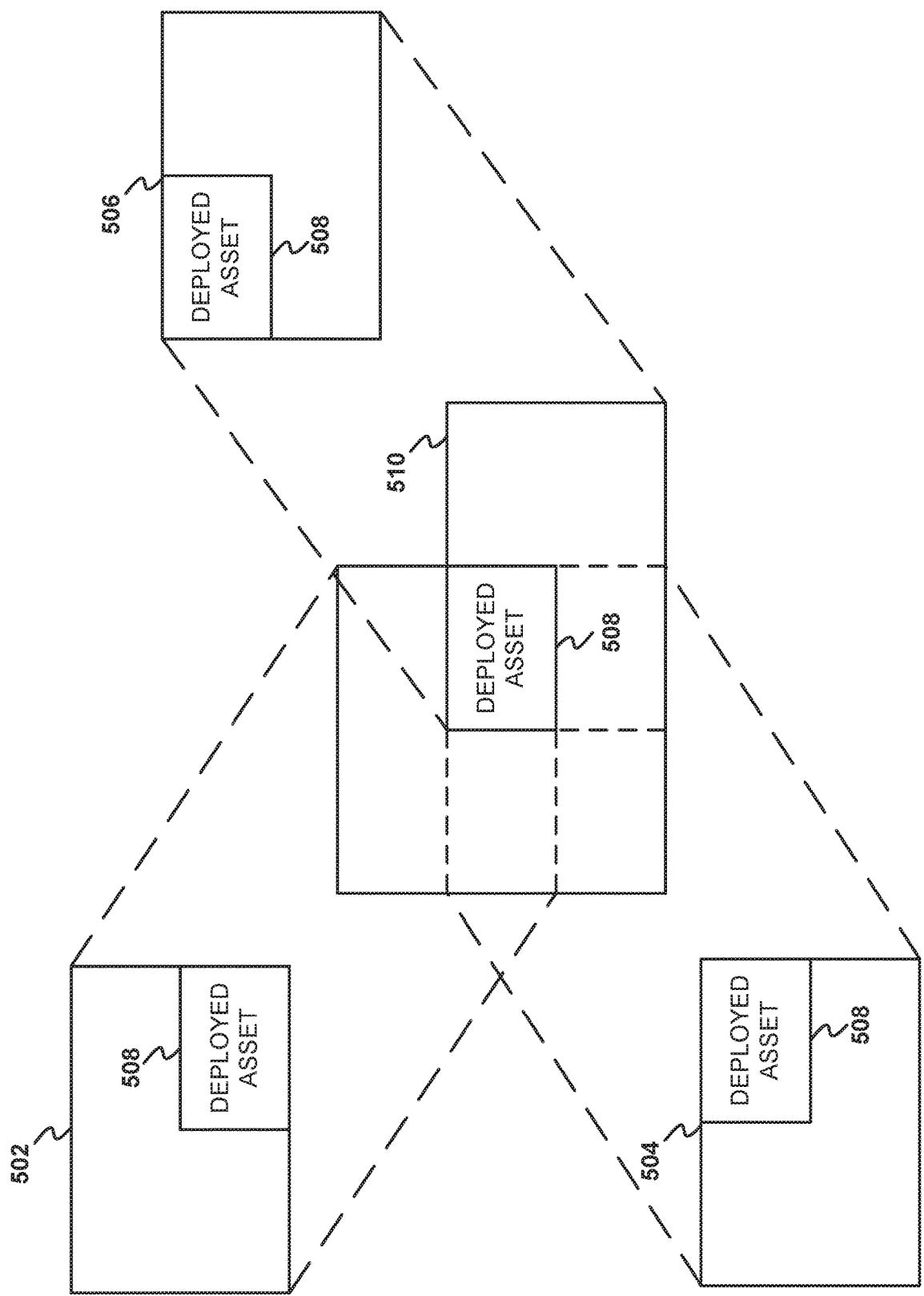
FIG. 5 is a functional block diagram of image stitching according to at least one embodiment.

Referring now to FIG. 5, a functional block diagram of image stitching is depicted, according to at least one embodiment. As previously described, image stitching may relate to the process of combining images together to create a single larger image. For example, the asset assessment program 110A, 110B (FIG. 1) may retrieve three images 502-506 from various sources, such as a user-uploaded image database or a GIS database. The asset assessment program 110A, 110B (FIG. 1) may then determine that the same deployed asset 508 is depicted in each of the retrieved images 502-506. The first image 502 may depict the deployed asset 508 in the lower right portion of the image frame. The second image 504 may depict the deployed asset 508 in the upper right portion of the image frame. The third image 506 may depict the deployed asset 508 in the upper left portion of the image frame. The asset assessment program 110A, 110B (FIG. 1) may combine the three images 502-506 depicting the deployed asset 508 together, which is a shared element within each image 502-506, into a stitched image 510. The stitched image 510 may depict the deployed asset 508 in the middle of the image frame.

Figure 6:
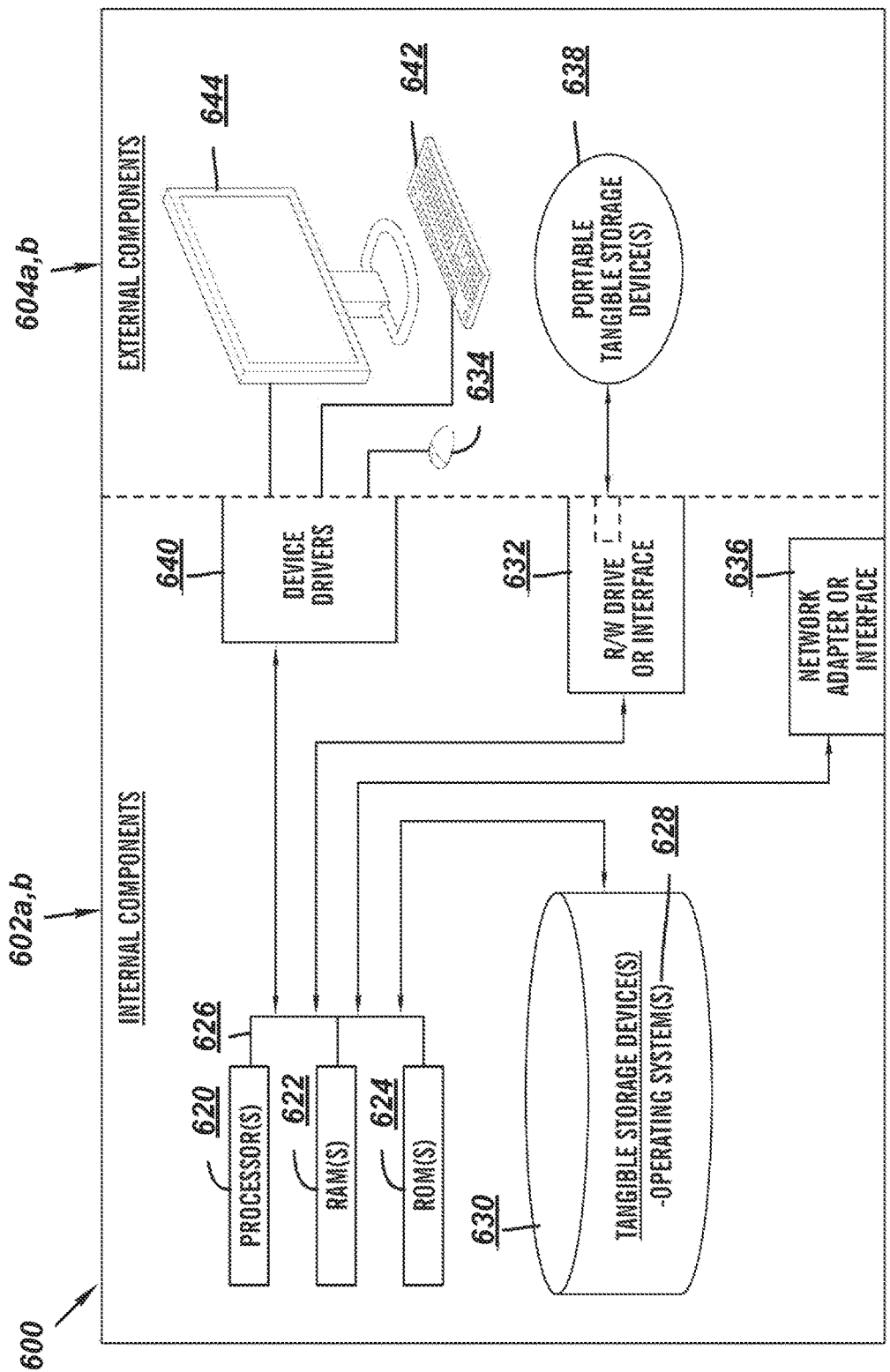
FIG. 6 is a block diagram of internal and external components of computers and servers depicted in FIG. 1 according to at least one embodiment.

FIG. 6 is a block diagram 600 of internal and external components of the client computing device 102A, 102B and the server 112A, 112B depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102A, 102B (FIG. 1) and the server 112A, 112B (FIG. 1) may include respective sets of internal components 602a,b and external components 604a,b illustrated in FIG. 6. Each of the sets of internal components 602 include one or more processors 620, one or more computer-readable RAMs 622 and one or more computer-readable ROMs 624 on one or more buses 626, and one or more operating systems 628 and one or more computer-readable tangible storage devices 630. The one or more operating systems 628, the software program 108A (FIG. 1) and the asset assessment program 110A (FIG. 1) in the client computing device 102A (FIG. 1), the software program 108B (FIG. 1) in the client computing device 102B (FIG. 1), and the asset assessment program 110B (FIG. 1) in the server 112A (FIG. 1) are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the asset assessment program 110A, 110B (FIG. 1), can be stored on one or more of the respective portable computer-readable tangible storage devices 638, read via the respective R/W drive or interface 632 and loaded into the respective hard drive 630.

Each set of internal components 602a,b also includes network adapters or interfaces 636 such as a TCP/IP adapter cards, wireless Wi-Fi interface cards, or 3G or 4G wireless interface cards or other wired or wireless communication links. The software program 108A (FIG. 1) and the asset assessment program 110A (FIG. 1) in the client computing device 102A (FIG. 1), the software program 108B (FIG. 1) in the client computing device 102B (FIG. 1), and the asset assessment program 110B (FIG. 1) in the server 112A (FIG. 1) can be downloaded to the client computing device 102A, 102B (FIG. 1) and the server 112A (FIG. 1) from an external computer via a network (for example, the Internet, a local area network or other, wide area network) and respective network adapters or interfaces 636. From the network adapters or interfaces 636, the software program 108A (FIG. 1) and the asset assessment program 110A (FIG. 1) in the client computing device 102A (FIG. 1), the software program 108B (FIG. 1) in the client computing device 102B (FIG. 1), and the asset assessment program 110B (FIG. 1) in the server 112A (FIG. 1) are loaded into the respective hard drive 630. The network may comprise copper wires, optical fibers, wireless transmission, routers, firewalls, switches, gateway computers and/or edge servers.

Each of the sets of external components 604a,b can include a computer display monitor 644, a keyboard 642, and a computer mouse 634. External components 604a,b can also include touch screens, virtual keyboards, touch pads, pointing devices, and other human interface devices. Each of the sets of internal components 602a,b also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
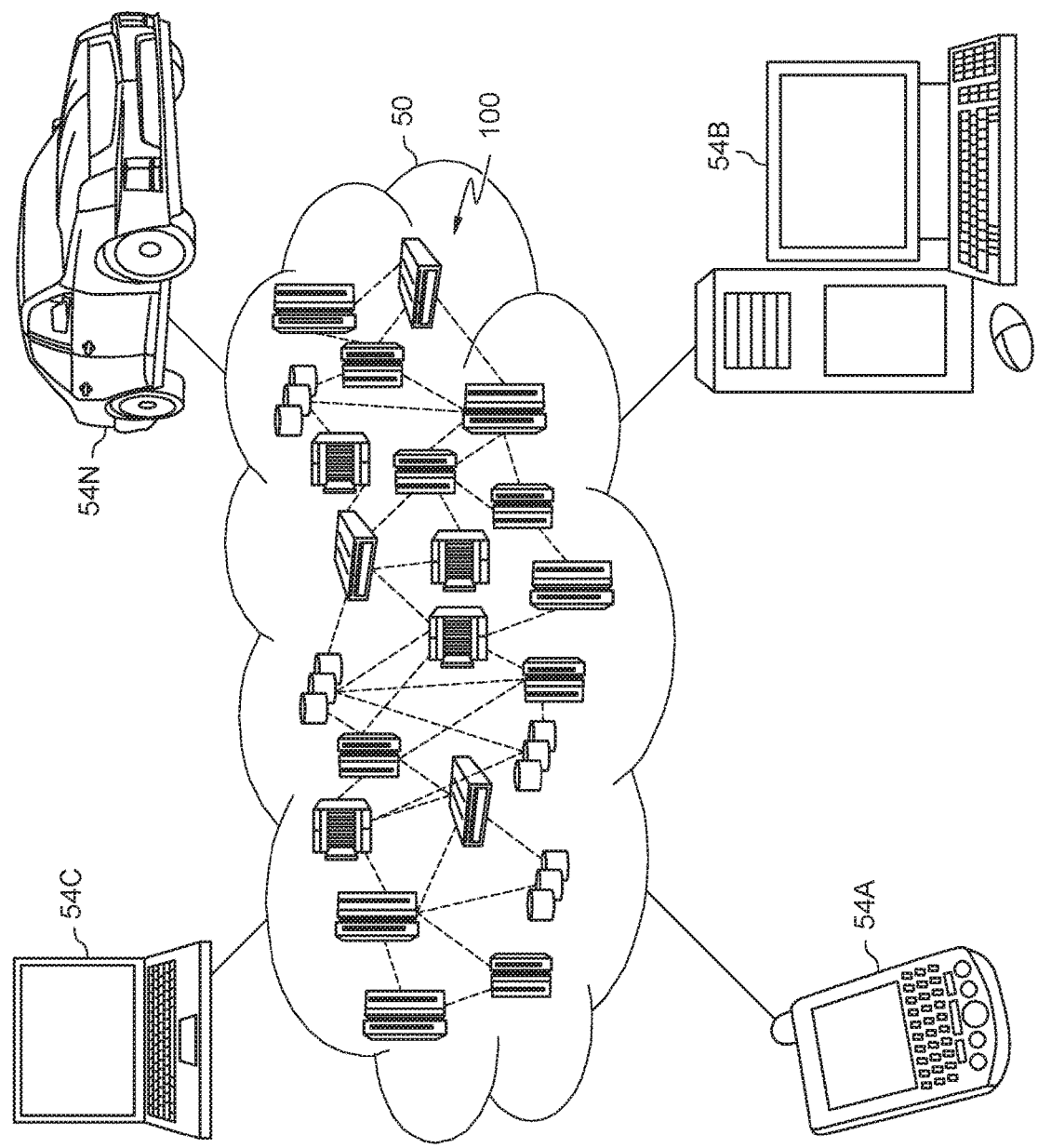
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
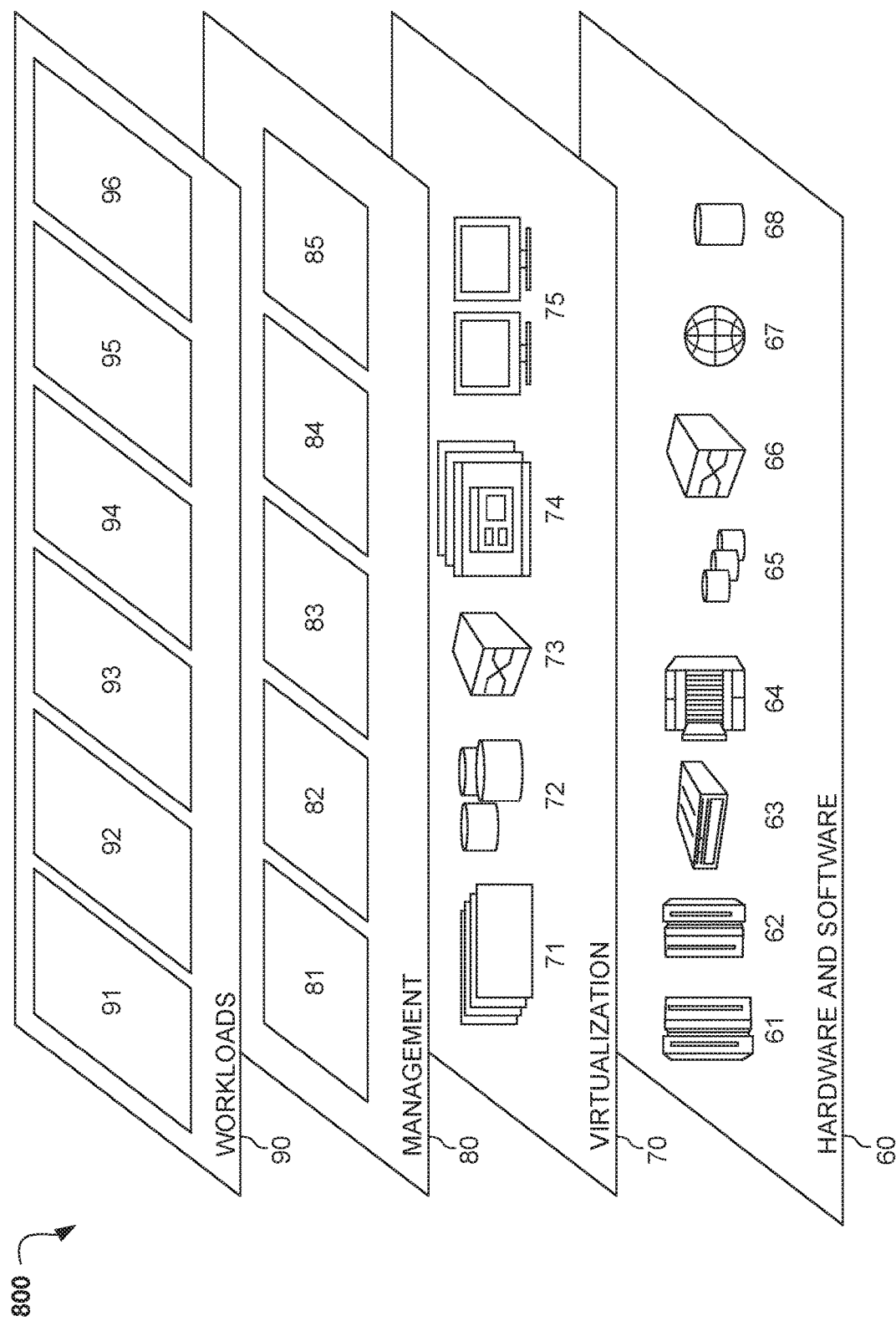
FIG. 8 depicts abstraction model layers according to an embodiment of the present invention.

Referring now to FIG. 8 a set of functional abstraction layers 800 provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deployed asset status identification 96. Deployed asset status identification 96 may relate to retrieving images depicting a deployed asset from various sources, stitching the retrieved images together to create a more complete depiction of the deployed asset, and performing vision and image processing techniques on the stitched image to identify the status of the deployed asset depicted within the stitched image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for assessing an asset status, the method comprising:

identifying, by a processor, an asset within a plurality of tangible, deployed assets;

retrieving, by a processor, a plurality of images from at least one data repository, wherein the plurality of images are captured within a preconfigured distance of the identified asset;

determining, by a processor, a portion of the retrieved plurality of images that depicts the identified asset, wherein presence of the identified asset within the portion of the retrieved plurality of images is detected using an object identification technology and an optical recognition technology, wherein one or more portions of the retrieved plurality of images are extracted and stitched together from each cardinal direction to create a three-dimensional model of the identified asset;

performing, by a processor, a plurality of image processing techniques on the determined portion, wherein the processed images are assigned meaning values utilizing interactive annotation tools, wherein the meaning value is a numerical value assigned to importance of a feature of the identified asset, wherein structural features are assigned a higher meaning value than aesthetic features;

classifying, by a processor, the processed images that are assigned meaning values utilizing the interactive tools into one or more annotated clusters, wherein the annotated clusters are assigned to future image feeds of the deployed assets using a classification algorithm when the future image feeds of the deployed assets depicts a portion of the identified asset;

creating, by a processor, an assessment of the asset status of the identified asset based on the performed plurality of image processing techniques, wherein the created assessment details whether the identified asset needs a repair or a replacement based on a type of the identified asset and obstruction to the identified asset due to flora overgrowth; and determining, by a processor, suggested corrective actions in response to the obstruction of the identified asset, wherein the determined suggested corrective actions are transmitted to a user along with the created assessment.

2. The method of claim 1, wherein the asset is identified based on at least one of a user selection on a graphical user interface and a period of elapsed time since a most recent status assessment was conducted for the asset.

3. The method of claim 1, wherein the plurality of data repositories comprise at least one of a user-uploaded image repository and a geographical information system database.

4. The method of claim 1, wherein the each image within the plurality of images is retrieved based on at least one of a geographical tag and a time-stamp.

5. The method of claim 1, wherein performing a plurality of image processing techniques further comprises:
creating a stitched image using the determined portion and a plurality of image stitching technology; and
determining at least one change to the created stitched image that satisfies a preconfigured threshold based on an asset type of the identified asset.

6. The method of claim 1, wherein performing a plurality of image processing techniques further comprises:
creating a first stitched image using the determined portion captured during a first time period and the plurality of image stitching technology;
creating a second stitched image using the determined portion captured during a second time period and the plurality of image stitching technology;
identifying a plurality of distinctive features of the identified asset depicted within the created first stitched image and the created second stitched image;
applying a plurality of image differencing technology to compare the created first stitched image and the created second stitched image; and
performing a cluster analysis of the identified plurality of distinctive features based on the applied plurality of image differencing technology.

7. The method of claim 1, wherein the plurality of image processing techniques is selected from a group consisting of a plurality of image differencing algorithms, a plurality of difference operation techniques, an optical flow analysis, a plurality of object identification algorithms, and a plurality of movement detection algorithms.

8. A computer system for assessing an asset status, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising: identifying, by a processor, an asset within a plurality of tangible, deployed assets;
retrieving a plurality of images from at least one data repository, wherein the plurality of images are captured within a preconfigured distance of the identified asset;
determining a portion of the retrieved plurality of images that depicts the identified asset, wherein presence of the identified asset within the portion of the retrieved plurality of images is detected using an object identification technology and an optical recognition technology, wherein one or more portions of the retrieved plurality of images are extracted and stitched together from each cardinal direction to create a three-dimensional model of the identified asset;
performing a plurality of image processing techniques on the determined portion, wherein the processed images are assigned meaning values utilizing interactive annotation tools, wherein the meaning value is a numerical value assigned to importance of a feature of the identified asset, wherein structural features are assigned a higher meaning value than aesthetic features;
classifying the processed images that are assigned meaning values utilizing the interactive tools into one or more annotated clusters, wherein the annotated clusters are assigned to future image feeds of the deployed assets using a classification algorithm when the future image feeds of the deployed assets depicts a portion of the identified asset;
creating an assessment of the asset status of the identified asset based on the performed plurality of image processing techniques, wherein the created assessment details whether the identified asset needs a repair or a replacement based on a type of the identified asset and obstruction to the identified asset due to flora overgrowth; and
determining suggested corrective actions in response to the obstruction of the identified asset, wherein the determined suggested corrective actions are transmitted to a user along with the created assessment.

9. The computer system of claim 8, wherein the asset is identified based on at least one of a user selection on a graphical user interface and a period of elapsed time since a most recent status assessment was conducted for the asset.

10. The computer system of claim 8, wherein the plurality of data repositories comprise at least one of a user-uploaded image repository and a geographical information system database.

11. The computer system of claim 8, wherein the each image within the plurality of images is retrieved based on at least one of a geographical tag and a time-stamp.

12. The computer system of claim 8, wherein performing a plurality of image processing techniques further comprises:
creating a stitched image using the determined portion and a plurality of image stitching technology; and
determining at least one change to the created stitched image that satisfies a preconfigured threshold based on an asset type of the identified asset.

13. The computer system of claim 8, wherein performing a plurality of image processing techniques further comprises:
creating a first stitched image using the determined portion captured during a first time period and the plurality of image stitching technology;
creating a second stitched image using the determined portion captured during a second time period and the plurality of image stitching technology;
identifying a plurality of distinctive features of the identified asset depicted within the created first stitched image and the created second stitched image;
applying a plurality of image differencing technology to compare the created first stitched image and the created second stitched image; and
performing a cluster analysis of the identified plurality of distinctive features based on the applied plurality of image differencing technology.

14. The computer system of claim 8, wherein the plurality of image processing techniques is selected from a group consisting of a plurality of image differencing algorithms, a plurality of difference operation techniques, an optical flow analysis, a plurality of object identification algorithms, and a plurality of movement detection algorithms.

15. A computer program product for assessing an asset status, the computer program product comprising:
one or more computer-readable non-transitory tangible storage medium and program instructions stored on at least one of the one or more tangible storage medium, the program instructions executable by a processor, the program instructions comprising:
identifying, by a processor, an asset within a plurality of tangible, deployed assets;

program instructions to retrieve a plurality of images from at least one data repository, wherein the plurality of images are captured within a preconfigured distance of the identified asset;

program instructions to determine a portion of the retrieved plurality of images that depicts the identified asset, wherein presence of the identified asset within the portion of the retrieved plurality of images is detected using an object identification technology and an optical recognition technology, wherein one or more portions of the retrieved plurality of images are extracted and stitched together from each cardinal direction to create a three-dimensional model of the identified asset;

program instructions to perform a plurality of image processing techniques on the determined portion, wherein the processed images are assigned meaning values utilizing interactive annotation tools, wherein the meaning value is a numerical value assigned to importance of a feature of the identified asset, wherein structural features are assigned a higher meaning value than aesthetic features;

program instructions to classify the processed images that are assigned meaning values utilizing the interactive tools into one or more annotated clusters, wherein the annotated clusters are assigned to future image feeds of the deployed assets using a classification algorithm when the future image feeds of the deployed assets depicts a portion of the identified asset;

program instructions to create an assessment of the asset status of the identified asset based on the performed plurality of image processing techniques, wherein the created assessment details whether the identified asset needs a repair or a replacement based on a type of the identified asset and obstruction to the identified asset due to flora overgrowth; and program instructions to determine suggested corrective actions in response to the obstruction of the identified asset, wherein the determined suggested corrective actions are transmitted to a user along with the created assessment.

16. The computer program product of claim 15, wherein the asset is identified based on at least one of a user selection on a graphical user interface and a period of elapsed time since a most recent status assessment was conducted for the asset.

17. The computer program product of claim 15, wherein the plurality of data repositories comprise at least one of a user-uploaded image repository and a geographical information system database.

18. The computer program product of claim 15, wherein the each image within the plurality of images is retrieved based on at least one of a geographical tag and a time-stamp.

19. The computer program product of claim 15, wherein performing a plurality of image processing techniques further comprises:
  program instructions to create a stitched image using the determined portion and a plurality of image stitching technology; and
  program instructions to determine at least one change to the created stitched image that satisfies a preconfigured threshold based on an asset type of the identified asset.

20. The computer program product of claim 15, wherein performing a plurality of image processing techniques further comprises:
  program instructions to create a first stitched image using the determined portion captured during a first time period and the plurality of image stitching technology;
  program instructions to create a second stitched image using the determined portion captured during a second time period and the plurality of image stitching technology;
  program instructions to identify a plurality of distinctive features of the identified asset depicted within the created first stitched image and the created second stitched image;
  program instructions to apply a plurality of image differencing technology to compare the created first stitched image and the created second stitched image; and
  program instructions to perform a cluster analysis of the identified plurality of distinctive features based on the applied plurality of image differencing technology.

* * * * *